United States Patent
Rewitz et al.

(10) Patent No.: US 10,915,066 B2
(45) Date of Patent: Feb. 9, 2021

(54) DEVICE AND METHOD FOR THE INDUSTRIAL PRODUCTION OF VOLUME REFLECTION HOLOGRAMS WITH SUBSTRATE-GUIDED RECONSTRUCTION BEAMS

(71) Applicant: Covestro Deutschland AG, Leverkusen (DE)

(72) Inventors: Christian Rewitz, Cologne (DE);
Rainer Hagen, Leverkusen (DE);
Thomas Fäcke, Leverkusen (DE);
Günther Walze, Leverkusen (DE);
Friedrich-Karl Bruder, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 309 days.

(21) Appl. No.: 16/064,845

(22) PCT Filed: Dec. 19, 2016

(86) PCT No.: PCT/EP2016/081766
§ 371 (c)(1),
(2) Date: Jun. 21, 2018

(87) PCT Pub. No.: WO2017/108704
PCT Pub. Date: Jun. 29, 2017

(65) Prior Publication Data
US 2019/0011880 A1    Jan. 10, 2019

(30) Foreign Application Priority Data

Dec. 22, 2015 (EP) .................................. 15202173

(51) Int. Cl.
*G03H 1/02* (2006.01)
*G03H 1/20* (2006.01)
(Continued)

(52) U.S. Cl.
CPC ......... *G03H 1/0248* (2013.01); *G03H 1/0408* (2013.01); *G03H 1/202* (2013.01);
(Continued)

(58) Field of Classification Search
None
See application file for complete search history.

(56) References Cited

U.S. PATENT DOCUMENTS

| 4,643,515 A | 2/1987 | Upatnieks |
| 4,790,613 A | 12/1988 | Moss |

(Continued)

FOREIGN PATENT DOCUMENTS

| EP | 2317511 A1 | 5/2011 |
| JP | S60122983 A | 7/1985 |

(Continued)

OTHER PUBLICATIONS

Engineering Tool Box, (2005). Modulus of Rigidity. [online] Available at: https://www.engineeringtoolbox.com/modulus-rigidity-d_946.html [Accessed Jun. 21, 2020]. (Year: 2005).*

(Continued)

*Primary Examiner* — Jennifer D. Carruth
(74) *Attorney, Agent, or Firm* — Faegre Drinker Biddle & Reath LLP (57) ABSTRACT

The invention relates to an apparatus (200, 300, 400, 600) for producing volume reflection holograms with substrate-guided reconstruction beams, comprising:
at least one transparent, planar carrier element (210, 310, 410, 610) comprising a first flat side (210.1) and a further flat side (210.2), at least one master element (206, 306, 406, 606) arrangeable at the first flat side (210.1) of the carrier element (210, 310, 410, 610) and at least one optical input coupling element (102, 202, 302, 402, 602) configured to optically couple a light beam (214, 216), (Continued)

wherein provision is made of at least one coupling portion (104, 204, 304, 404, 604) configured to mechanically establish an optical contact between the input coupling element (102, 202, 302, 402) and at least one holographic recording medium (208, 308, 408) providable on the further flat side (210.2) of the carrier element (210, 310, 410) or configured to mechanically establish an optical contact between the further flat side of the carrier element (610) and at least one holographic recording medium (608) providable on a flat side (605) of the optical input coupling element (602), wherein at least the coupling portion (104, 204, 304, 404, 604) is formed from a material with a shear modulus of between 1000 Pa and 50 MPa, preferably of between 30,000 Pa and 30 MPa.

13 Claims, 3 Drawing Sheets

(51) Int. Cl.
  *G03H 1/04* (2006.01)
  *G02B 6/34* (2006.01)
(52) U.S. Cl.
  CPC ....... *G02B 6/34* (2013.01); *G03H 2001/0415* (2013.01); *G03H 2223/16* (2013.01); *G03H 2223/18* (2013.01); *G03H 2223/25* (2013.01); *G03H 2227/03* (2013.01); *G03H 2227/04* (2013.01)

(56) References Cited

U.S. PATENT DOCUMENTS

| | | |
|---|---|---|
| 5,330,264 A | 7/1994 | Ando et al. |
| 8,921,012 B2 | 12/2014 | Weiser et al. |
| 2006/0232838 A1* | 10/2006 | Clube .................. G03H 1/0005 359/12 |
| 2007/0024939 A1 | 2/2007 | Harris |
| 2008/0304120 A1 | 12/2008 | Hayashida et al. |
| 2011/0058240 A1 | 3/2011 | Dell'Eva et al. |

FOREIGN PATENT DOCUMENTS

| | | |
|---|---|---|
| WO | WO-9005317 A1 | 5/1990 |
| WO | WO-9418603 A2 | 8/1994 |
| WO | WO-2008100593 A1 | 8/2008 |

OTHER PUBLICATIONS

OnlineConversion.com, (1997-2010) Pressure Conversion. [online] Available at: http://www.onlineconversion.com/pressure.htm [Accessed Jun. 21, 2020]. (Year: 1997).*

International Search Report for PCT/EP2016/081766 dated Mar. 2, 2017.

Written Opinion of the International Searching Authority for PCT/EP2016/081766 dated Mar. 2, 2017.

Owega, S., et al., "Solid-State Optical Coupling for Surface Plasmon Resonance Sensors", Sensors and Actuators B: Chemical: International Journal Devoted to Research and Development of Physical and Chemical Transducers, 2006, Bd. 114, Nr. 1, pp. 212-217.

* cited by examiner

DEVICE AND METHOD FOR THE INDUSTRIAL PRODUCTION OF VOLUME REFLECTION HOLOGRAMS WITH SUBSTRATE-GUIDED RECONSTRUCTION BEAMS

CROSS-REFERENCE TO RELATED APPLICATIONS

This application is a national stage application (under 35 U.S.C. § 371) of PCT/EP2016/081766, filed Dec. 19, 2016, which claims benefit of European Application No. 15202173.9, filed Dec. 22, 2015, both of which are incorporated herein by reference in their entirety.

The invention relates to an apparatus for producing volume reflection holograms with substrate-guided reconstruction beams, comprising at least one transparent, planar carrier element comprising a first flat side and a further flat side, and at least one master element arrangeable at the first flat side of the carrier element. Furthermore, the invention relates to a method for producing volume reflection holograms with substrate-guided reconstruction beams and an input coupling element for an apparatus for producing volume reflection holograms with substrate-guided reconstruction beams.

BACKGROUND OF THE INVENTION

Volume holograms, which are also referred to as thick holograms in the literature, are used in many optical applications, such as display applications. According to the definition of the volume hologram, the thickness thereof is much greater than the wavelength of light used for recording the hologram. The volume hologram is a light-diffracting holographic optical element (HOE) based on a light-transmissive medium, which, as a phase or absorption grating, was written into the volume of the holographic recording layer.

In the case of volume holograms, a distinction is made, as a matter of principle, between two types of volume holograms: transmission volume holograms and reflection volume holograms. The reflection volume holograms, in particular, are relevant to this application.

Typical recording media for volume holograms are metal halide emulsions, dichromated gelatin, photopolymers and photochromic materials. Their functionality, chemical composition and applications are described in the literature ["Optical holography", by P. Hariharan, Cambridge University Press (1996), ISBN 0 521 43348 7].

In principle, the prior art has disclosed apparatuses or installations and methods for producing reflection holograms, for example in the aforementioned document. Thus, it is known, inter ilia, to use a beam splitter to divide or guide a collimated laser beam in two separate object and reference beam paths. It is understood that further optical elements, such as lenses, spatial filters, etc., can be provided in order to e.g. widen and/or homogenize the partial beams and/or to establish the desired wavefronts. The object to be holographed, which is also referred to as a master element, is illuminated by the object beam and diffracts light in the direction of the holographic recording medium. By way of example, the holographic recording medium can be a photographic plate. Said plate is positioned within the apparatus, in particular at a location where the two partial beams are made to interfere, or the two partial beams are made to interfere at the location of the plate.

The installations or apparatuses can be adapted in the case of other objects to be holographed and in a manner depending on the desired geometric function of the volume hologram to be produced (e.g. reconstruction angle, emission characteristic) and depending on the desired reconstruction colour spectrum. Thus, for example, document U.S. 2011/0058240 A1 shows a complicated interference setup, in which white-light volume holograms can be produced by means of three laser beams of different colour.

A single-beam setup can be implemented in other apparatuses or installations known from the prior art. A single-beam setup can be used if the object or master element is, in particular, a master hologram, of which a copy is intended to be produced. Document U.S. 2007/024939 A describes an apparatus in various embodiments, in which hologram copies can be produced in a semi to fully automatic manner by means of the conveying device.

Single-beam setups are generally distinguished by the fact that the master element and the holographic recording medium are brought into contact. The master element can be formed from a reflection volume hologram. In particular, the master element can generate the object wave or the object beam such that the non-diffracted laser light transmitted through the recording medium (reference beam) interferes with the light beam reflectively diffracted by the master element (object beam). As a result of this, a copy of the master hologram can be generated or written at the location of the holographic recording medium.

By way of example, a master element can be arranged on a flat side of a glass plate and the holographic recording medium can be arranged on the other flat side.

Moreover, coupling of light into planar light-guiding substrates and planar wave-guiding substrates by using (optical) input coupling elements is known from the prior art WO 1994/018603 A1.

Substrate-guided reconstruction beams are characteristic for, in particular, compact optical setups, in which the light source is coupled in through a thin waveguide or a light-guiding plate and decoupled by a volume hologram positioned at this waveguide or this light-guiding plate. By way of example, this is suitable for flat illumination bodies, art holography or special illumination devices for electronic displays. Conversely, such setups can also be used for collecting light, as is of relevance in e.g. novel solar cells or camera systems. What is common to these setups, in particular, is that the light-beam geometry of the substrate-guided light is essentially similar to a plane wave and the object beam can be configured both as likewise guided in the substrate and as propagating out of the substrate (free-space geometry). The object beam can correspond to a complex wavefront, as is the case e.g. in three-dimensional images. Likewise, use can also be made of other geometries, such as that of a diffuser or a spherical or cylindrical convex or concave wave front.

However, the production of volume reflection holograms with substrate-guided reconstruction beams, i.e. edge-illuminated volume holograms, is connected with problems. By way of example, applications of such holograms are known from the documents U.S. Pat. Nos. 4,643,515 A and 4,790,613 A.

Thus, for the purposes of production in accordance with the prior art, a carrier element is provided with a master element at a first flat side while a holographic recording medium is placed on the other flat side of the carrier element. In order to couple a light beam with a flat direction of incidence (grazing incidence), which is necessary for producing a volume reflection hologram with substrate-guided reconstruction beams, into the holographic recording medium, a user manually positions an input coupling element onto the holographic recording medium.

Overall, it is necessary to establish a sufficient optical contact between master element, carrier element, holographic recording medium and the input coupling element. The problem herein lies in obtaining a good optical contact between an (input coupling) flat side of the input coupling element and the holographic recording medium, as well as between the holographic recording medium and the carrier element. While one of the optical contacts can be established in a simple manner by e.g. a lamination process, the production of the other optical contact was found to be difficult in practice. In particular for a fault-free production process, it is essential to be able to establish a bubble-free contact between these elements.

In the case where the holographic recording medium is provided on the carrier element (i.e. the optical contact is established between carrier element and recording medium), the prior art has disclosed the use of so-called index matching liquids for establishing a sufficient optical contact between input coupling element and recording medium. These liquids are applied between the input coupling element and the holographic recording medium. A sufficiently bubble-free optical contact can be established between input coupling element and recording element by virtue of the input coupling element then subsequently being pressed thereon. However, it is necessary to completely remove the index matching liquids after the recording process. Thus, a disadvantage of this is that, firstly, high work safety must be satisfied and, secondly, automatic and, in particular, efficient removal of the index matching liquid is very complicated. Chemical incompatibility of the index matching liquid with the holographic recording medium is also problematic. By way of example, in a related process, U.S. Pat. No. 5,330,264 A shows that the amount of the index matching liquid (in this case silicone oil) for contacting two rigid surfaces may be greatly reduced in order to shorten the waiting time in a mass production process.

WO2008/100593 in turn describes this contacting with the aid of index matching liquids such as xylene, decalin, water and melted gelatin mixes. The gelatin mixes are applied in hot and liquid form, thereupon cure at room temperature and may be stripped away after the holographic exposure. Disadvantages here include the liquid application, the assumable long curing time and the restriction to only single use.

BRIEF SUMMARY OF THE INVENTION

Therefore, the invention is based on the object of providing an apparatus and a method for producing volume reflection holograms with substrate-guided reconstruction beams on an industrial scale, which enable, in a simple manner, in particular without the use of index matching liquids, an efficient production of volume reflection holograms with substrate-guided reconstruction beams, in particular a mass production-capable method with roll-to-roll handling of the recording medium.

In accordance with a first aspect of the invention, the object is achieved by an apparatus in accordance with present Patent Claim 1. The apparatus for producing volume reflection holograms with substrate-guided reconstruction beams comprises at least one transparent, planar carrier element comprising a first flat side and a further flat side. The apparatus comprises at least one master element arrangeable at the first flat side of the carrier element. The apparatus comprises at least one optical input coupling element configured to optically couple a light beam.

DETAILED DESCRIPTION OF THE INVENTION

The apparatus comprises at least one coupling portion configured to mechanically establish an optical contact between the input coupling element, and at least one holographic recording medium providable on the further flat side of the carrier element or configured to mechanically establish an optical contact between the further flat side of the carrier element and at least one holographic recording medium providable on a flat side of the optical input coupling element. At least the coupling portion is formed from a material with a shear modulus of between 1000 Pa and 50 MPa, preferably of between 30,000 Pa and 30 MPa.

What was identified according to the invention is that a good, in particular bubble-free optical contact can be achieved between an input coupling element (or carrier element) and a holographic recording medium without the use of an index matching liquid by virtue of an input coupling element or the carrier element comprising at least one coupling element formed from a material with a shear modulus of between 1000 Pa and 50 MPa, preferably of between 30,000 Pa and 30 MPa. As a result of these specific mechanical properties of the coupling portion, it is possible, in particular, to bring a flat side of the coupling portion into optical contact with a flat side of the holographic recording medium by mechanical delivery and at the same time to ensure that the coupling for the recording medium, preferably also for the coupling portion, can be released again, likewise by mechanical movement, without residue and in a non-destructive manner. Since the mechanical coupling brought about in this way is accordingly configured releasably by subsequent mechanical decoupling, the apparatus is suitable for use in the production of volume reflection holograms with substrate-guided reconstruction beams on an industrial scale and does not involve the use of index matching liquids.

The present apparatus is configured, as mentioned, in particular to produce a special type of hologram, in particular a substrate-guided volume reflection hologram. A volume reflection hologram with substrate-guided reconstruction beams is distinguished in the present case by virtue of the reconstruction beam, i.e. the beam which satisfies the diffraction condition, falling very flat onto the hologram, as is the case in edge-lit geometry.

On account of this special geometry, the hologram or holographic optical element (HOE) produced thus is suitable for applications with substrate-guided reconstruction beams. Here, the planar hologram is optically coupled to a waveguide or light-guiding substrate, in which reconstruction beams propagate. By way of example, this is implemented by way of total-internal reflection (TIR) or by direct illumination through the waveguide or light-guiding substrate.

The apparatus according to the invention has at least one carrier element. The carrier element has a first flat side and a further flat side. Furthermore, the carrier element is formed from a transparent material, such as glass. In particular, transparent should be understood to mean that the majority (e.g. >90%) of the light emitted by an employed light source, such as a laser beam, passes through the carrier elements.

The carrier element can be formed as a planar plate with preferably two planar flat sides or as a curved plate with a predeterminable curvature. In particular, the form of the flat side can correspond to, or match, the form of the volume reflection hologram to be produced, as required by an application. Preferably, the carrier element, such as a glass plate, can serve as lamination medium for the holographic recording medium. Alternatively, the optical input coupling element can serve as lamination medium for the holographic recording medium. Preferably, the carrier element can be formed as an optically clear and essentially planar protective layer and, in particular, be formed from thin glass or from organic and/or inorganic and/or hybrid protective lacquer or as a thermoplastic layer or from combinations thereof. Furthermore, the carrier element can be embodied with sufficient mechanical stability in relation to the pressure of a pressing roller and the tensile forces occurring during delamination.

The master element can be arranged on the first flat side of the carrier element. In particular, the master element is in optical contact with the carrier element. By way of example, it can be laminated thereon and/or it can be kept between the carrier element and a further carrier element, preferably situated therebelow. The master element, such as a master volume hologram, comprises the information which should be written into the holographic recording medium. In other words, the master volume hologram, in particular a master volume reflection hologram, can be copied. The master volume hologram can generate various substrate-guided or free-space wavefronts as an object beam from the substrate-guided reconstruction beam. These wavefronts can be a plane wave, a cylindrical or spherical wave (which can also be multifocal), the image wave of an object, e.g. a diffuser. Use can also be made of a plurality of more complex combinations of these various wavefronts.

On the further flat side which, in particular, is opposite the first flat side of the carrier element, it is possible to provide the, in particular, planar holographic recording medium, for example in the form of a film. Alternatively, the holographic recording medium can be provided on a flat side of the input coupling element. The distance between the master element and the holographic recording medium, i.e., in particular, the thickness of the carrier element, is preferably at least shorter than the coherence length of the laser source. Preferably, the distance between the master element and the holographic recording medium is as small as possible. The distance can preferably be less than 5 mm, particularly preferably less than 1 mm. The carrier element can be embodied as a lacquer. A further carrier element, for example in the form of a glass plate, can be provided under the master element. An exemplary setup comprises a lacquer layer as a carrier element, followed by the master element, followed by an optically clear adhesive layer (OCA), followed by a glass layer.

In order to be able to couple a light beam with a desired, predeterminable flat angle, the apparatus comprises an (optical) input coupling element. The input coupling element can be a refractive optical element, particularly preferably an optical prism.

The input coupling element (or the carrier element) comprises a coupling portion which forms at least the flat side of the input coupling element (or of the carrier element), which lies in (direct) contact with the holographic recording medium in a coupling position.

According to the invention, it was identified that, for a good optical contact, at least the coupling portion should be formed from a soft, not permanently adhesive (for the purposes of subsequent detachment, i.e. decoupling) optical material. In particular, use can be made of an optically clear material. According to the invention, provision is made for at least the coupling portion to be formed from a material with a shear modulus of between 1000 Pa and 50 MPa, preferably of between 30,000 Pa and 30 MPa.

The apparatus according to the invention allows, in a simple manner, a bubble-free optical connection to be established between the input coupling element and the copying medium or holographic recording medium (or between carrier element and copying medium) on a surface which includes the illumination surface during the hologram recording. The apparatus according to the invention enables optical coupling of large surfaces, even of those which are not perfectly plane, without needing to exert an excessively high pressure onto the copying medium. By way of example, a pressure of 2 to 5 bar can be exerted. In contrast to the prior art, the coupling portion allows in particular reversible coupling and/or decoupling. This is a prerequisite for use on an industrial scale, which targets a high throughput. In particular, the holographic recording medium is neither damaged physically nor damaged chemically. The production of a volume hologram is more efficient in terms of time as no cleaning steps, as are necessary when using index matching liquids, are required. The apparatus can be serviced easily and with little outlay since, in particular, it is possible to dispense with liquid substances. Moreover, only low contact pressures are required.

According to a first embodiment of the apparatus according to the invention, the input coupling element and the coupling portion (or the carrier element and the coupling portion) can be homogeneously formed from a material with a shear modulus of between 1000 Pa and 50 MPa, preferably of between 30,000 Pa and 30 MPa. In other words, the input coupling element and the coupling portion (or the carrier element and the coupling portion) can be manufactured as an integral component, so that no discernible separate layers are present on or in the component. In an alternative, or additional, refinement, the input coupling element (or the carrier element), as a coupling portion, can have a coating formed from a material with a shear modulus of between 1000 Pa and 50 MPa, preferably of between 30,000 Pa and 30 MPa. By way of example, the input coupling element (or carrier element) can be coated by an appropriate lacquer for forming the coupling portion. A coating can also be applied by a (mould) casting process or injection moulding process. In particular, the coating can be a planar or spherical coating. In the case of a spherical coating, simplified contacting is facilitated. The same applies to the decoupling/detachment of the coupling portion from the holographic recording medium. The spherical form can also be provided when, as stated above, the input coupling element and the coupling portion (or the carrier element and the coupling portion) are formed homogeneously from one material. The coating or layer can have a thickness of at least 1 µm, preferably of at least 50 µm and particularly preferably of more than 100 µm.

In a further embodiment according to the invention, the input coupling element (or the carrier element) and the coupling portion can be formed as separate elements. An optical main body and a transportable film can form the input coupling element (or the carrier element). In particular, the coupling portion can be formed as a transportable film from a material with a shear modulus of between 1000 Pa and 50 MPa, preferably of between 30,000 Pa and 30 MPa. By way of example, the coupling portion can be a film which can be transported by way of a conveying device comprising e.g. at least one rolling-over element. The advantage consists of the fact that consumed film material can be resupplied (in an automated manner).

In order to effect optical coupling and decoupling between the coupling portion and the holographic recording medium which is as efficient and unchanging as possible, it is possible, in accordance with a further embodiment, for provision to be made of at least one handling element, at least mechanically connectable to the input coupling element (or carrier element), which is configured to move the input coupling element (or carrier element). By way of example, the handling element can be a mechanical apparatus for lifting and/or lowering the input coupling element or a robot arm for displacing the input coupling element. Alternatively, the handling element can be e.g. a mechanical apparatus for lifting and/or lowering the carrier element or a robot arm for displacing the carrier element. Alternatively, it is also possible for the input coupling element and the carrier element to be moved.

Preferably, provision can be made of at least one controller for controlling the handling element. The controller can be configured to actuate the handling element in such a way that, in a coupling step, the input coupling element (or the carrier element) can be moved from an initial position into a coupling position by way of the handling element. Alternatively, or additionally, the controller can be configured to actuate the handling element in such a way that, in a decoupling step, the input coupling element (or the carrier element) can be moved by the handling element from the coupling position into the initial position. This is effected such that no damage to the recording medium and/or the coupling portion occurs during decoupling. Optical coupling can be brought about in a coupling step and/or decoupling can be brought about in a decoupling step, in particular in an automated manner.

In principle, the input coupling element (or the carrier element) can be placed onto, or optically coupled with, the holographic recording medium in any way for as long as the coupling surface is formed by the coupling portion formed according to the invention. In one embodiment, the surface of the coupling portion to be coupled can be aligned and approached in a plane parallel manner in relation to the holographic recording medium.

In a further preferred embodiment, the controller can be configured to actuate the handling element in such a way that, in a first partial step of the coupling step, the input coupling element (or the carrier element) is moved from the initial position into an intermediate position. At least one edge of the coupling portion can contact the holographic recording medium in the intermediate position. Preferably, only one edge of the coupling portion can contact the holographic recording medium in the intermediate position. In order to particularly reliably obtain a bubble-free contact, it is particularly preferable not to place the whole flat side of the coupling portion onto the holographic recording medium at the same time in order to avoid an air inclusion, particularly in the case of large surfaces to be coupled.

Particularly preferably, the controller can be configured to actuate the handling element in such a way that, in a further partial step of the coupling step, the input coupling element (or the carrier element) is moved from the intermediate position into the coupling position by way of a tilting movement. In particular, a predeterminable angle $\alpha$ can lie between a flat side of the coupling portion and a flat side of the holographic recording medium in the intermediate position. In particular, the input coupling element (or the carrier element) can be moved or displaced by a tilting movement until the angle $\alpha$ is substantially 0°. That is to say, the angle $\alpha$ can be reduced continuously by the tilting movement. The tilting movement allows unwanted air to escape in a simple manner such that even large surfaces can be optically coupled with a high quality in a reliable manner.

The material of the coupling portion with the special mechanical properties enables, in particular, unevenness to be compensated and air inclusions to be prevented.

In an alternative preferred embodiment, the controller can be configured to actuate the handling element in such a way that, in a further partial step of the coupling step, the input coupling element (or the carrier element) can be moved from the intermediate position into the coupling position by way of a translational movement. Preferably, there can be an angle $\beta$ between a flat side of the coupling portion and a flat side of the holographic recording medium in the intermediate position. The angle $\beta$ can satisfy the condition $\beta < \arctan(d/l)$, where d is the layer thickness of the coupling portion in an uncompressed state of the input coupling portion and l is the length of the coupling portion, in particular the length between two opposite edges of the coupling portion. Here, one of the edges can be the edge which contacts the holographic recording medium in the intermediate step. The coupling portion can be approached under a constant angle $\beta$. The growing coupling surface arising as a result of the increasing compression renders it possible, in particular, to avoid air inclusions. Moreover, it is possible to compensate unevenness on, and between, coupling portion and carrier element (or input coupling element) or the holographic recording medium arranged thereon. In a coupled state, the coupling portion can be virtually completely compressed on one side of the coupling surface, while it experiences little compression on the other side.

The two partial steps of the coupling step can preferably be carried out in one continuous motion.

In the coupling position, the handling element can preferably be displaced in such a way that the coupling portion is held in a force-free manner in order, in particular, to minimize the deformation of the material of the coupling portion.

Moreover, the master element can be configured to diffract an incident light beam, in particular the laser beam, in an at least partly reflective manner. The master element can be a volume hologram, a surface hologram, preferably a surface hologram sealed with a highly refractive lacquer or any other layer with a diffractive action. A reflection volume hologram is preferred. By way of example, the master element can be embedded between two glass plates. A laser beam, suitable, in particular, to reconstruct the master element, incident on a flat side of the input coupling element can pass through the input coupling element and the holographic recording medium, as well as the carrier element (reference beam). The laser beam can be incident on the master element, which reflects an object beam into the recording medium. As a result of interference between the two partial beams (object beam and reference beam), it is possible to generate a volume holographic copy of the master element in the recording medium.

The volume reflection hologram to be produced can also be referred to as a thick hologram. A volume reflection hologram can have a thickness $d > g^2/\lambda$, where g is the spacing of the grating planes, i.e. the geometric distance between two adjacent maximums of the grating modulation, and $\lambda$, is the wavelength of the light beam. The master hologram can preferably likewise be a volume hologram with a thickness $d > g^2/\lambda$.

In principle, the holographic recording medium can be formed from different materials. Preferably, the holographic recording medium can be formed from a material selected from the group comprising photoresistive materials, photopolymers, (a fine grain) silver halide film, dichromated gelatin, photochromic materials or photorefractive materials. Here, photopolymers, a silver halide photo film and dichromated gelatin are particularly preferred as material.

For the purposes of a particularly efficient production of holograms, provision in accordance with a further embodiment can be made of a conveying device configured to transport the holographic recording medium. The conveying device can comprise at least one deflection roller or the like for conveying or transporting the holographic recording medium, which is preferably formed as a film. In particular, a recorded portion of the holographic recording medium can be transported away after recording said portion of the holographic recording medium and a still unrecorded portion of the holographic recording medium can be brought into position by transport. In particular, the conveying device can be controlled in such a way (e.g. by the aforementioned controller) that the film can be moved or transported while the input coupling element (or the carrier element) does not contact the holographic recording medium. The conveying device or transport device can comprise a lamination/delamination unit, for example to laminate the holographic recording medium on the carrier element or the input coupling element. An apparatus which is operable, in particular, in a fully automatic manner can be provided.

In a particularly preferred embodiment, the holographic recording medium can comprise a light-sensitive recording layer and a clear optical substrate. Preferably, the transport unit can comprise a deflection roller installation in a dark room which ensures that the holographic recording medium can be transported with the necessary advance speeds and with the required film windings, as well as the permitted winding radii and tensions.

Preferably, at least the coupling portion, preferably the whole input coupling element, can be formed from a transparent, non-scattering material. In particular, use can be made of a material which does not exhibit birefringence. The optical parameter Haze can be at least less than 1%. The transmission value can be at least greater than 70%, preferably greater than 85%, in relation to the employed laser light.

Furthermore, in accordance with another embodiment of the apparatus according to the invention, at least the coupling portion can be formed from a material selected from the group comprising polyurethane, silicone, natural rubber, polyvinyl butyral, polyvinyl acetate, polyvinyl chloride, polyacrylate and/or epoxy resin.

Particularly suitable polyurethanes are polyurethanes which are essentially free from hard segments. Preferred are, in particular, polyurethanes with aliphatic isocyanate building blocks on the basis of pentamethylene diisocyanate, hexamethylene diisocyanate, isophorone diisocyanate and H12-methylene diisocyanate, which have reacted with polyols, preferably diols. Preferred diols comprise aliphatic polyesters, polyethers on ethylene glycol, propylene glycol or polytetrahydrofuran and block copolymers with polyester and polyether segments.

Particularly suitable silicones are silicones on the basis of polydimethylsiloxanes (PDMS), polydiphenylsiloxanes or else mixed polysiloxanes with the repeating unit $(O-SiR1R2)_n$, with R1, R2=methyl or phenyl. Systems which use hydrosilylation as crosslinking reaction (e.g. of a polydimethylsiloxane with a terminal C=C double bond, which reacts with a silane-functional polydimethylsiloxane) are preferred. Here, platinum compounds are suitable catalysts.

Thermoplastic resins such as polymethyl methacrylate, polyvinyl butyral, polyvinyl chloride or polyvinyl acetate can likewise be used with plasticizers. Suitable plasticizers are compounds such as esters, ethers, glycols, glycol ethers.

Polyacrylates with internal plasticizers, e.g. the polyacrylates of relatively long-chain acrylic esters, such as e.g. butyl acrylate, hexyl acrylate, isooctyl acrylate or mixtures thereof, allow the production of materials according to the invention.

Epoxy resins comprising aliphatic glycidyl ethers and glycidyl esters, which can be crosslinked with aliphatic amines and carboxylic acids, are likewise suitable. Suitable amines are e.g. ether amines (e.g. Jeffamine from Huntsman, aspartates such as Desmophen NH 1220 by Covesto).

Provision can be made of at least one laser source in a further embodiment of the apparatus. The laser source or laser unit can be configured to expose the holographic recording medium in a static manner or with a scanning laser beam. The master element can be scanned by a moving laser light line in a scanning method. The master element can be exposed statically over the entire area thereof in a static exposure method. Exposure can be carried out by way of continuous wave (CW) lasers or short pulse lasers. Furthermore, exposure can be effected using one or more laser beams with different waveforms, different wavelengths and/or different intensity distributions. It is understood that at least one optical element can be provided for beam shaping and/or beam guiding purposes.

Furthermore, provision can be made of providing the carrier element and/or the holographic recording medium with an absorber film. The absorber film can specifically change the intensity ratio between reference beam and object beam, the so-called beam ratio in the recording medium, for example in order to influence the temporal formation of the hologram and/or the properties thereof.

A further aspect of the invention relates to a method for producing volume reflection holograms with substrate-guided reconstruction beams, comprising:
  providing at least one transparent, planar carrier element with a first flat side and a further flat side, a master element being arranged at the first flat side of the carrier element,
  providing at least one optical input coupling element with a flat side,
  providing a holographic recording medium on the further flat side of the carrier element or the flat side of the optical input coupling element,
  optically coupling the holographic recording medium with a flat side of a coupling portion in a coupling step in such a way that a light beam is coupled into the holographic recording medium by way of the input coupling element and reflected by the master element,
  at least the coupling portion being formed from a material with a shear modulus of between 1000 Pa and 50 MPa, preferably of between 30,000 Pa and 30 MPa.

The method can be carried out, in particular, by the apparatus described above. In particular, the method according to the invention can establish a (virtually) bubble-free optical contact.

A further aspect of the invention relates to an input coupling element (or carrier element) configured for the optical input coupling of a light beam for an apparatus for producing volume reflection holograms with substrate-guided reconstruction beams according to one of Claims 1 to 12. The input coupling element (or carrier element) comprises at least one coupling portion configured to establish optical contact with at least one holographic recording medium providable on a further flat side of a carrier element (or input coupling element). At least the coupling portion is formed from a material with a shear modulus of between 1000 Pa and 50 MPa, preferably of between 30,000 Pa and 30 MPa.

The input coupling element (or carrier element) can be used, in particular, in the above-described apparatus.

There now are a number of possibilities for refining and developing the apparatus according to the invention, the production method according to the invention and the input coupling element according to the invention. To this end, reference is made, firstly, to the patent claims subordinate to the independent patent claims and, secondly, to the description of exemplary embodiments in conjunction with the drawing. In the drawing:

Below, the same reference signs are used for the same elements.

Figure 1:
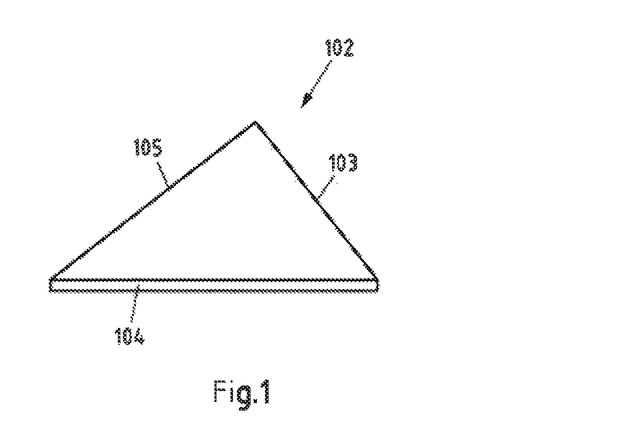
FIG. 1 shows a schematic view of an exemplary embodiment of an input coupling element in accordance with the present invention.

FIG. 1 shows a schematic view of an exemplary embodiment of an optical input coupling element 102 in accordance with the present invention. In the present case, the optical input coupling element 102 has a coupling portion 104. The coupling portion 104 is configured to establish the optical contact between the optical input coupling element 102 and a holographic recording medium.

The optical input coupling element 102 can be a refractive index-matched optical input coupling element 102. In particular, this means that there is no refractive index jump, or a refractive index jump which is as small as possible, at the transition to the next medium. By way of example, the input coupling element 102 can be a prism. A light beam, in particular a laser beam, can enter through a side face 103, 105 of the input coupling element 102 and it can emerge from the input coupling element 102 via the coupling portion 104 or the input coupling surface 104. There can preferably be an antireflection coating on the side face 103, 105 into which the lasers beam enters. If p-polarized light is used, the face can be aligned in relation to the entering light beam in such a way that the light beam is incident at the Brewster angle. The side face can be planar or else have a shaped surface which, in particular, serves to modify the wavefront of the entering wave. The other side face can preferably be blackened, provided with an absorbing film and/or aligned in such a way that beams coming from the input coupling surface cannot be reflected back to the input coupling surface.

It was identified that for the purposes of coupling the coupling portion 104 with a holographic recording medium, in particular for coupling without bubbles, and subsequent unproblematic, in particular for the recording medium damage-free, decoupling, at least the coupling portion 104 should be formed from a sufficiently soft or viscoelastic material (without plastic deformability).

The material can be a refractive index-matched material. At least the coupling portion 104 of the input coupling element 102 can be formed from a material with a shear modulus of between 30,000 Pa (N/m$^2$) and 30 MPa. By way of example, the input coupling element 102 can be coated with an appropriate material for the purposes of producing the coupling portion 104. By way of example, a lacquer with a corresponding shear modulus can be applied onto the input coupling element 102 for the purposes of forming the coupling portion 104. It is likewise possible to provide the input coupling element 102 with the coupling portion 104 in a mould casting process.

In an alternative embodiment, provision can be made for the input coupling element 102 to be formed completely from a material (or plurality of materials) with a shear modulus of between 30,000 Pa (N/m$^2$) and 30 MPa. In a further exemplary embodiment, the input coupling element 102 can be formed from two separate elements, such as a main body and the coupling portion 104. By way of example, the separate coupling portion 104 can be a plate or a film, which is formed from a material with a shear modulus of between 30,000 Pa (N/m$^2$) and 30 MPa. Preferably, provision can be made of a conveying device which may comprise at least one deflection roller element. The conveying device can be configured to transport the film and provide the film between the main body of the input coupling element and the holographic recording medium. By way of example, a corresponding, at least two-part setup of an input coupling element 104 allows used or damaged film material to be replaced by new film material in an automated manner.

In any case it is ensured that following the bubble-free coupling of the coupling portion 104 with the holographic recording medium, unproblematic decoupling is possible, so that this process can be repeated many times, which is a prerequisite for use for producing volume reflection holograms with substrate-guided reconstruction beams on an industrial scale.

Figure 2:
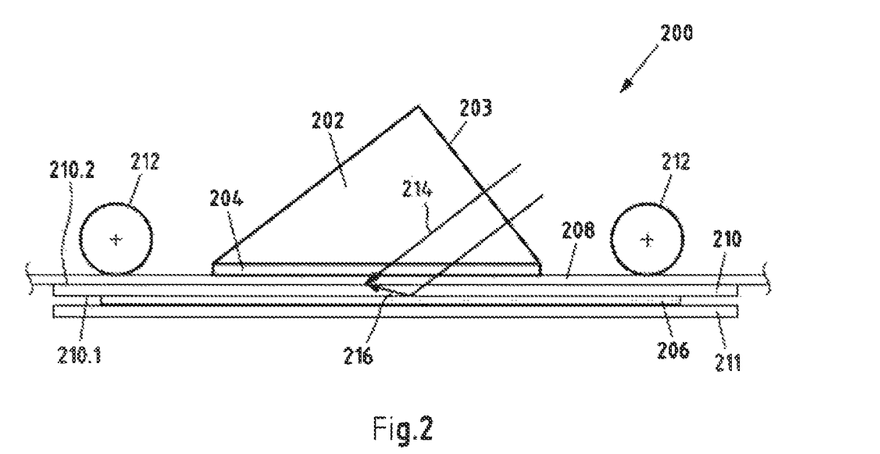
FIG. 2 shows a schematic view of an exemplary embodiment of an apparatus in accordance with the present invention.

FIG. 2 shows a schematic view of an exemplary embodiment of an apparatus 200 in accordance with the present invention. The schematically depicted apparatus 200 is configured to produce volume reflection holograms with substrate-guided reconstruction beams.

The apparatus 200 comprises at least one planar and transparent carrier element 210. By way of example, a glass plate 210 can be provided as carrier element 210 in the present case. The carrier element has a first flat side 210.1 and a further flat side 210.2, in particular lying opposite the first flat side 210.1. Even if the further flat side 210.2 is formed as a planar flat side 210.2 in the present exemplary embodiment, the invention is not restricted thereto. By way of example, there are applications in which a volume hologram has a certain curvature. By way of example, this may be desired in a so-called head-up display in a vehicle. Preferably, the form of the further flat side 210.2 can be formed in a manner dependent on the application of the volume hologram or the desired curvature of the volume hologram. By way of example, the further flat side 210.2 can be curved or have a specific radius of curvature.

As can be gathered further from FIG. 2, a master element 206 is arranged on the first flat side 210.1. In particular, the master element 206, like a master hologram 206, is in optical contact with at least part of the first flat side 210.1 of the carrier element 210. By way of example, the master element 206 can be laminated onto the first flat side 210.1 of the carrier element 210. In particular, the master element 206 contains the information which should be written into the holographic recording medium 208 in order to produce a volume reflection holograms with substrate-guided reconstruction beams.

In an alternative embodiment, provision can be made of a further carrier element, such as a further glass plate 211. In this case, the master element 206 can be arranged between both carrier elements.

As was already described, a holographic recording medium 208 to be written can be provided on the further flat side 210.2 of the carrier element 210. In a simple case, this can be effected by manual action of an operator. In the depicted preferred variant, provision can be made of a conveying device 212 comprising one or more deflection roller element(s) 212 for transporting the holographic recording medium 208, for example in the form of a film, and for positioning it on the carrier element. In particular, this enables industrial manufacturing of volume reflection holograms. Optionally, provision can be made of a lamination/delamination unit (not shown here).

The holographic recording medium 208 can be formed from metal halide emulsions, dichromated gelatins, photopolymers, photochromic materials or similar materials. Moreover, holographic recording media 208 comprising a thermoplastic substrate and a holographic recording layer with a shear modulus<30 MPa are preferred. Photopolymers comprising a thermoplastic substrate and a holographic recording layer with a shear modulus<0.71 MPa, as described in document EP2317511 A1, are particularly preferred. Particularly in the case of the photopolymers described in EP2317511 A1, it is preferred, in general, for the holographic recording layer to be arranged on the side of the photopolymer facing away from the coupling portion in such a way that the coupling portion is always in contact with the thermoplastic substrate (and not with the holographic recording layer) in the coupling position.

Figure 6:
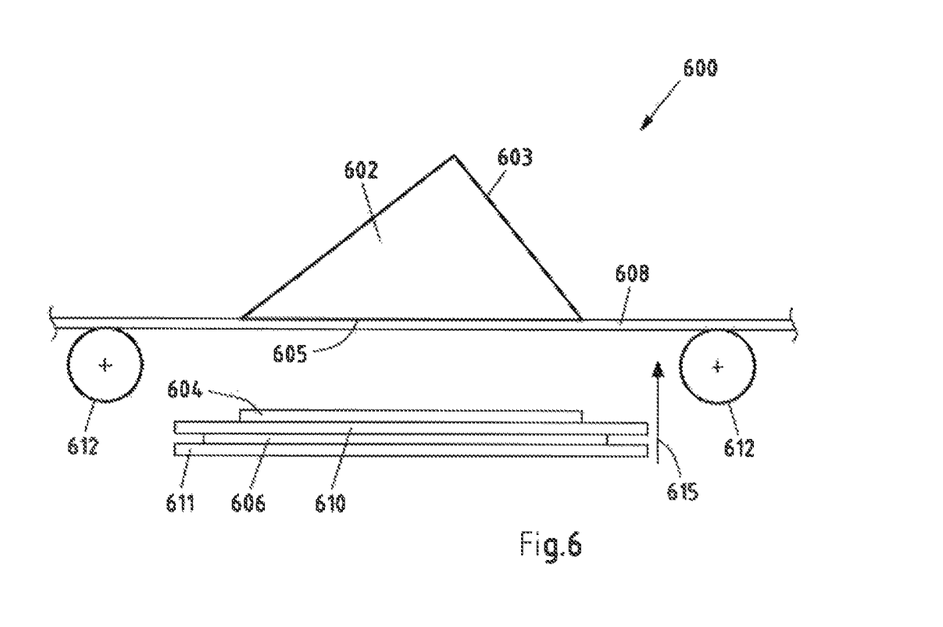

Moreover, the apparatus 200 comprises an input coupling element 202 with a coupling portion 204, with at least the coupling portion 204 being formed from a material with a shear modulus of between 30,000 Pa (N/m$^2$) and 30 MPa. It is preferable for the substrate side to point to the coupling portion 204 when using holographic recording media 208 comprising a thermoplastic substrate and a holographic recording layer. Means for displacing the input coupling element 202, for example in order to place it mechanically onto the recording medium 208 in such a way that an (ideal) optical contact is established between the coupling portion 204 and the holographic recording medium 208 are not depicted. By decoupling the coupling portion 204 from the holographic recording medium 208 after the recording operation, the optical contact can be released again simply and without damage. In particular, a handling element mechanically connected to the input coupling element 202 and a controller configured to control the handling element can be provided for displacing or moving the input coupling element 202. As an alternative, the input coupling element can also be at rest and the carrier element can be automatically displaced, as will be described below (FIG. 6).

After producing the optical contact, which is in particular free from bubbles, between the coupling portion 204, in particular the flat side of the coupling portion 204, and the holographic recording medium 208, it is possible to activate a light source (not depicted here), in particular a laser, in order to record onto the recording medium. Two beam paths 214 and 216 are depicted purely schematically for elucidating the recording process.

The laser light 214 and 216 enters the optical input coupling element 202 at a flat side 203. Via the coupling portion 204, the beam 216, as reference beam 216, passes through the holographic recording medium 208 and then passes through the carrier element 210. Subsequently, the beam 216 is diffracted at least partly reflectively by the master hologram 206 such that the diffracted partial wave, as object beam 216, interferes geometrically with the reference beam 214 in the holographic recording medium 208 and writes the desired information into the holographic recording medium 208. It is possible to identify that the angle of incidence can preferably be unequal to the angle of reflection.

Furthermore, it may be necessary, at the master hologram 206, for the non-diffracted beam ($0^{th}$ order, which may occur if the diffraction efficiency is not 100%) to have to be prevented from being reflected back in the direction of the recording medium 208 as a result of total-internal reflection (TIR) at the master hologram-air interface.

In a preferred embodiment, this can be effected by a refractive index-matched material on the rear side of the master hologram 206, i.e. the flat side which does not contact the carrier plate, into which the non-diffracted beam can enter. By way of example, provision can be made of an absorbing film, a correspondingly thick carrier plate 211, such as a second glass plate 211, or a further prism, which displaces and tilts the reflecting interface so far downward that the reflected beam can no longer enter the recording medium 208 (in the relevant region). Moreover, the carrier plate 211 can also be equipped to be absorbing for the employed laser light (e.g. blackened).

Exposure can be effected statically or with a scanning laser beam. Exposure can be effected with at least one continuous wave (CW) laser and/or short pulse laser. Furthermore, (depending on the object) exposure can be effected using one or more laser beams with different waveforms, different wavelengths and different intensity distributions.

Figure 3:
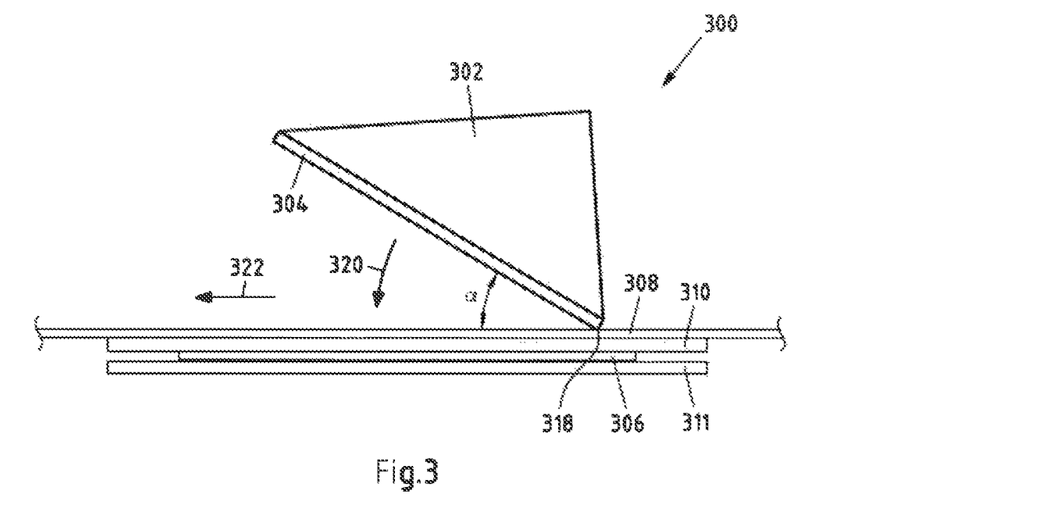
FIG. 3 shows a schematic view of a further exemplary embodiment of an apparatus in accordance with the present invention, with the input coupling element being situated in an intermediate position.

FIG. 3 shows a schematic view of a further exemplary embodiment of an apparatus 300 in accordance with the present invention. In particular, FIG. 3 serves to elucidate a preferred embodiment of the coupling step. In the coupling step, the optical contact between the coupling portion of the input coupling element and the holographic recording medium is established by mechanically displacing the input coupling element. Thus, FIG. 3 shows the apparatus 300 at a specific time within the coupling step. In particular, the apparatus 300 is depicted in an intermediate position of the coupling step.

It is possible to identify in FIG. 3 that the input coupling element 302 contacts the holographic recording medium 308 with an edge 318 in the intermediate position. In particular, the input coupling element 302 can be displaced mechanically in such a way that (only) one edge 318 of the coupling portion 304 contacts the holographic recording medium 308 (in a flush manner). By way of example, means (not shown here), such as a handling element, can be mechanically coupled to the input coupling element 302 in order to move or displace the input coupling element 302. By way of example, a robotic arm can be provided to this end.

After the holographic recording medium 308 has been provided on the carrier element 310, the input coupling element 302 can be moved from an initial position into the intermediate position, for example by means of the handling element and a controller. By way of example, the input coupling element 302 can be displaced mechanically in such a way that, in the intermediate position, an edge 318 of the input coupling element 302, in particular the coupling portion 304, is placed against the holographic recording medium 308.

Then, the input coupling element 302 can be moved from the intermediate position into a coupling position. By way of example, the input coupling element 302 can be placed onto the holographic recording medium 308 in a tilting movement (corresponding to the arrow 320), in order, in particular, to obtain optical coupling between the input coupling element 302, preferably the whole flat side of the coupling portion 304, and the holographic recording medium 308. In other words, the angle α can preferably be reduced continuously to approximately 0°. By way of example, a robotic arm can be (mechanically) connected to the input coupling element 302 in order to correspondingly displace the input coupling element 302. The advantage of the present coupling process consists, in particular, of the fact that air can escape in the direction 322. Particularly good and bubble-free optical contact can be obtained.

It is understood that the input coupling element 302 is moved, preferably continuously, from an initial position into a coupling position.

Figure 4:
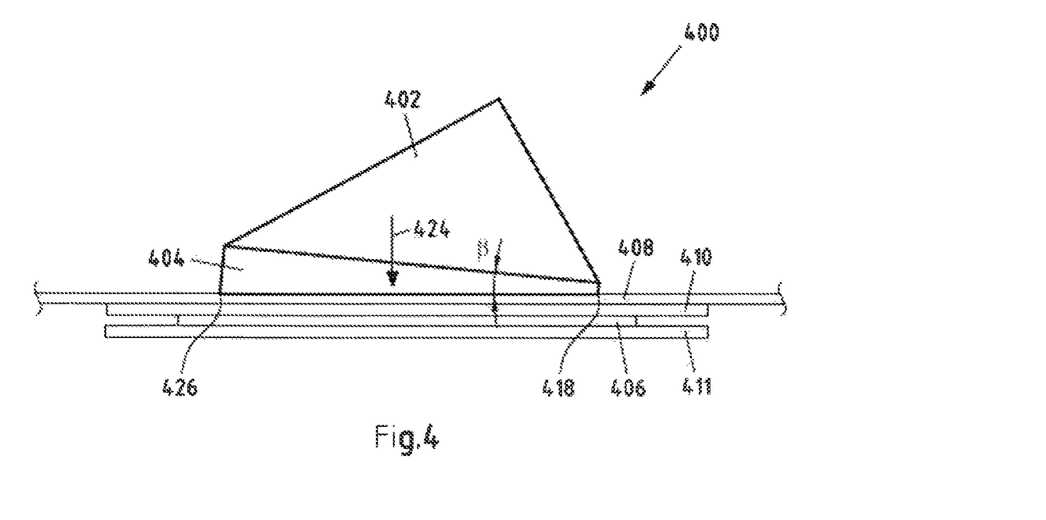
FIG. 4 shows a schematic view of a further exemplary embodiment of an apparatus in accordance with the present invention.

FIG. 4 shows a further schematic view of a further exemplary embodiment of an apparatus 400 in accordance with the present invention. In particular, FIG. 4 serves to elucidate a preferred embodiment of the coupling step. Thus, FIG. 4 shows the apparatus 400 at a specific time in the coupling step. In particular, FIG. 4 shows the apparatus at a time at which the optical contact has already been established between the input coupling element 402, in particular a flat side of the coupling portion 404, and the holographic recording medium 408. In order words, the input coupling element 402 is in a coupling position.

In this coupling step option, the input coupling element 402 can also initially be displaced into an intermediate position. In the intermediate position, the input coupling element 402 can be placed with (only) one edge 418 against the holographic recording medium 408. In particular, the input coupling element 402 can initially be displaced in such a way that an edge 418 of the coupling portion 404 contacts the recording medium 408 (in a flush manner). In particular, an edge 418 of the input coupling element 402 is placed against the holographic recording medium 408 at an angle β.

Here, the angle β satisfies the following condition:

$$\beta < \arctan(d/l), \quad (1)$$

where d is the layer thickness of the coupling portion 404 in an uncompressed state and l is the length of the coupling portion 404, in particular the length between the first edge 418 and the further edge 426.

As described below, placing the input coupling element 402 with a corresponding angle β allows an optical contact to be established over the whole flat side of the coupling portion 404. After the input coupling element 402 has been placed on a first edge 418 at an angle β (intermediate position), the input coupling element 402 can be displaced along a (continuous) translational movement in one direction (see arrow 424), which extends normally to the area of a (planar) holographic recording medium 408, until a sufficient optical contact is established between the input coupling element 402, or the coupling portion 404, and the holographic recording medium 408 (coupling position). A sufficient optical contact is achieved, in particular, if the edge 426 of the coupling portion 404, which lies opposite the first contact 418, is also in optical contact with the holographic recording medium 408.

Overall, the soft coupling portion 404 is initially contacted and compressed at one side 418 in the present case. The growing coupling area arising as a result of the increasing compression renders it possible to avoid air inclusions in this case. Moreover, unevenness on and between the flat side of the coupling portion 404 and the carrier element 410, comprising the holographic recording medium 408, is compensated. As can be gathered from FIG. 4, the coupling portion 404 is virtually completely compressed at one side 418 of the coupling face in the coupled state, while it only experiences little compression on the other side 426.

It is understood that the input coupling element 402 is preferably moved continuously from an initial position into a coupling position.

In a further embodiment of the coupling step, the coupling portion of the input coupling element can be aligned with, and approach the holographic recording medium, in a plane-parallel manner.

Figure 5:
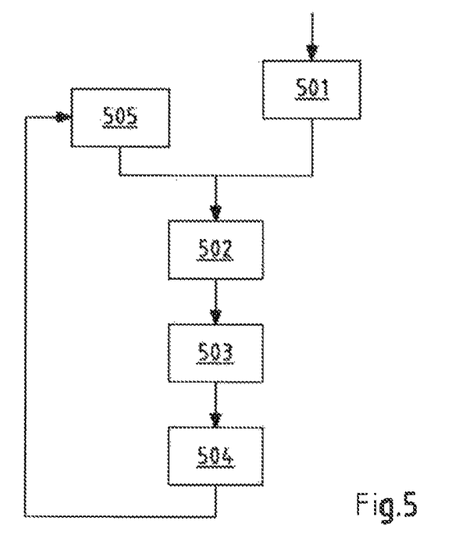
FIG. 5 shows a diagram of an exemplary embodiment of a method in accordance with the present invention and FIG. 6 shows a schematic view of a further exemplary embodiment of an apparatus in accordance with the present invention.

The functionality of a preferred exemplary embodiment of an apparatus according to the invention is described below by means of FIG. 5. In particular, FIG. 5 shows a flowchart of an exemplary embodiment of a method in accordance with the present invention.

In a first step 501, a holographic recording medium can be provided on the further flat side of a carrier element. Preferably, a not yet written holographic recording medium can be provided by way of a conveying device. Here, the carrier element has a master element at the first flat side.

In a next step 502, which can also be referred to as coupling step 502, the input coupling element is optically coupled to the holographic recording medium. By way of example, this can be carried out in accordance with the explanations in relation to FIG. 3 or 4, to which reference is made at this point.

In the next step 503, at least one light source, in particular a laser, is then activated and the input coupling element or the holographic recording medium is exposed. Optionally, there can be a predeterminable waiting time prior to the exposure and after the coupling in step 502. The exposure can be effected statically or with a scanning laser beam. The exposure can be effected with a continuous wave (CW) laser or short pulse laser. Furthermore, (depending on the object) the exposure can be effected using one or more laser beams with different waveforms, different wavelengths and different intensity distributions.

As described previously, interference is brought about within the holographic recording medium by the diffracted reflection of the laser beams at or by the master element, and so the desired hologram is written.

After the exposure, the input coupling element is decoupled from the described holographic recording medium in a next step 504. In particular, the input coupling element can be appropriately displaced by suitable means, such as a handling element and an associated controller. Decoupling is easily possible due to the embodiment according to the invention of at least the coupling portion of the input coupling element. Further coupling and decoupling can be carried out directly afterward in a continuously or semi-continuously configured method.

In a next step 505, the written holographic recording medium can be detached (delaminated) from the carrier element and transported onward, in particular by a conveying device and an associated controller, and an unwritten holographic recording medium can be provided, preferably simultaneously, on the further flat side of the carrier element. Then, it is possible to continue with step 502.

FIG. 6 shows a schematic view of a further exemplary embodiment of an apparatus 600 in accordance with the present invention. In order to avoid repetition, it is substantially the differences between the exemplary embodiment in accordance with FIG. 6 and the exemplary embodiment, in particular in accordance with FIG. 2, that are explained below.

In the present exemplary embodiment, the holographic recording medium 608 is provided, in particular laminated, on the flat side 605 of the optical input coupling element 602. In particular, no coupling portion is provided between the holographic recording medium 608 and the optical input coupling element 602 in the present case. In the depicted preferred variant, provision can be made of a conveying device 612 comprising one or more deflection roller element (s) 612 in order to transport the holographic recording medium 608, for example in the form of a film, and to position it on the input coupling element. In particular, this enables industrial manufacturing of volume reflection holograms. Optionally, provision can be made of a lamination/delamination unit (not shown here) in order to laminate the holographic recording medium 608 onto the flat side 605 of the optical input coupling element 602.

As can be further gathered from FIG. 6, the coupling portion 604 is arranged on a flat side of the carrier element 610 in the present case. The components 604 and 610 can be formed as separate elements. By way of example, the carrier element 610 can be provided with a coupling portion 604 in the form of a coating described above. The separate coupling portion 604 can also be a plate or a film. Provision can also be made for the components 604 and 610 to be produced homogeneously from one material. In any case, at least the coupling section 604 is formed from a material with a shear modulus of between 1000 Pa and 50 MPa, preferably of between 30,000 Pa and 30 MPa.

Preferably the carrier element 610, in particular the layer system comprising coupling portion 604, carrier element 610, the master element 606 and an optional further carrier element 611, can be displaced by way of a handling element (not shown here). In particular, the carrier element 610, in particular the layer system, can be displaced in the direction 615 in order to establish the optical coupling between the holographic recording medium 608, which is provided on the input coupling element 602, and the carrier element 610. It is understood that, alternatively, the layer system can be displaced in accordance with the explanations in relation to the exemplary embodiments in accordance with FIGS. 3 and 4. After recording the holographic recording medium 606, the layer system can be displaced in the opposite direction 615.

The invention claimed is:

1. An Apparatus for producing volume reflection holograms with substrate-guided reconstruction beams, comprising:
at least one transparent, planar carrier element comprising a first flat side and a further flat side,
at least one master element arrangeable at the first flat side of the carrier element and
at least one optical input coupling element configured to optically couple a light beam,
wherein
provision is made of at least one coupling portion configured to mechanically establish an optical contact between the input coupling element and at least one holographic recording medium providable on the further flat side of the carrier element or configured to mechanically establish an optical contact between the further flat side of the carrier element and at least one holographic recording medium providable on a flat side of the optical input coupling element,
provision is made of at least one handling element, at least mechanically connectable to the input coupling element, configured to move the input coupling element, or
provision is made of at least one handling element, at least mechanically connectable to the carrier element, configured to move the carrier element,
wherein at least the coupling portion is formed from a material with a shear modulus of between 1000 Pa and 50 MPa.

2. The apparatus according to claim 1, wherein
the input coupling element and the coupling portion are homogeneously formed from a material with a shear modulus of between 1000 Pa and 50 MPa, or
the coupling portion and the carrier element are homogeneously formed from a material with a shear modulus of between 1000 Pa and 50 MPa, or
the input coupling element or the carrier element, as a coupling portion, has a coating formed from a material with a shear modulus of between 1000 Pa and 50 MPa, or
the input coupling element and the coupling portion are formed as separate elements, wherein the coupling portion, is formed as a transportable film from a material with a shear modulus of between 1000 Pa and 50 MPa, or
the carrier element and the coupling portion are formed as separate elements, wherein the coupling portion, is formed as a transportable film from a material with a shear modulus of between 1000 Pa and 50 MPa.

3. The apparatus according to claim 1, wherein
provision is made of at least one controller for controlling the handling element,
the controller being configured to actuate the handling element in such a way that, in a coupling step, the input coupling element or the carrier element is moved from an initial position into a coupling position and/or
the controller being configured to actuate the handling element in such a way that, in a decoupling step, the input coupling element or the carrier element is moved from the coupling position into the initial position.

4. The apparatus according to claim 3, wherein
the controller is configured to actuate the handling element in such a way that, in a first partial step of the coupling step, the input coupling element or the carrier element is moved from the initial position into an intermediate position,
at least one edge of the coupling portion contacting the holographic recording medium in the intermediate position.

5. The apparatus according to claim 4, wherein
the controller is configured to actuate the handling element in such a way that, in a further partial step of the coupling step, the input coupling element or the carrier element is moved from the intermediate position into the coupling position by way of a tilting movement and/or
the controller is configured to actuate the handling element in such a way that, in a further partial step of the coupling step, the input coupling element or the carrier element is moved from the intermediate position into the coupling position by way of a translational movement.

6. The apparatus according to claim 4, wherein
the controller is configured to actuate the handling element in such a way that, in a further partial step of the coupling step, the input coupling element or the carrier element is moved from the intermediate position into the coupling position by way of a translational movement,
there is an angle β between a flat side of the coupling portion and a flat side of the holographic recording medium in the intermediate position,
the angle β satisfying the condition β<arctan(d/l),
where d is the layer thickness of the coupling portion in an uncompressed state and l is the length of the coupling portion.

7. The apparatus according to claim 1, wherein the master element is configured to diffract an incident light beam in an at least partly reflective manner.

8. The apparatus according to claim 1, wherein the holographic recording medium is formed from a material selected from the group comprising photoresistive materials, photopolymers, silver halide film, dichromated gelatin, photochromic materials or photorefractive materials.

9. The apparatus according to claim 1, wherein provision is made of a conveying device configured to transport the holographic recording medium.

10. The apparatus according to claim 1, wherein at least the coupling portion is formed from a material selected from the group comprising polyurethane, silicone, natural rubber, polyvinyl butyral, polyvinyl acetate, polyvinyl chloride, polyacrylate and/or epoxy resin.

11. The apparatus according to claim 1, wherein
provision is made of at least one laser source and
wherein the laser source is configured to expose the holographic recording medium in a static manner or with a scanning laser beam.

12. A method for producing volume reflection holograms with substrate-guided reconstruction beams, comprising:
providing at least one transparent, planar carrier element with a first flat side and a further flat side, a master element being arranged at the first flat side of the carrier element,
providing at least one optical input coupling element with a flat side,
providing a holographic recording medium on the further flat side of the carrier element or the flat side of the optical input coupling element,
optically coupling the holographic recording medium with a flat side of a coupling portion in a coupling step in such a way that a light beam is coupled into the holographic recording medium by way of the input coupling element and reflected by the master element,
providing at least one handling element, at least mechanically connectable to the input coupling element, configured to move the input coupling element, or
providing at least one handling element, at least mechanically connectable to the carrier element, configured to move the carrier element,
at least the coupling portion being formed from a material with a shear modulus of between 1000 Pa and 50 MPa.

13. Input coupling element configured for the optical input coupling of a light beam for an apparatus for producing volume reflection holograms with substrate-guided reconstruction beams according to claim 1,
the input coupling element comprising at least one coupling portion configured to establish optical contact with at least one holographic recording medium providable on a further flat side of a carrier element and
at least the coupling portion being formed from a material with a shear modulus of between 1000 Pa and 50 MPa.

* * * * *